United States Patent
Kim et al.

(10) Patent No.: US 10,027,715 B2
(45) Date of Patent: Jul. 17, 2018

(54) ELECTRONIC DEVICE AND METHOD FOR ENCRYPTING CONTENT

(71) Applicant: Samsung Electronics Co., Ltd., Gyeonggi-do (KR)

(72) Inventors: Bong-Jun Kim, Gyeonggi-do (KR); Se-Hoon Kim, Jeollanam-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 139 days.

(21) Appl. No.: 15/160,128

(22) Filed: May 20, 2016

(65) Prior Publication Data

US 2016/0359916 A1    Dec. 8, 2016

(30) Foreign Application Priority Data

Jun. 3, 2015  (KR) .................. 10-2015-0078744
Aug. 25, 2015  (KR) .................. 10-2015-0119727

(51) Int. Cl.
  *H04L 29/06*    (2006.01)
  *G06F 21/62*    (2013.01)
  *H04L 9/16*    (2006.01)

(52) U.S. Cl.
  CPC .......... *H04L 63/20* (2013.01); *G06F 21/6209* (2013.01); *H04L 9/16* (2013.01); *H04L 63/061* (2013.01); *H04L 63/123* (2013.01)

(58) Field of Classification Search
  CPC ......... H04L 63/20; H04L 9/16; H04L 63/061; H04L 63/123; G06F 21/6209
  USPC ....................................................... 713/171
  See application file for complete search history.

(56) References Cited

U.S. PATENT DOCUMENTS

| 5,027,395 A  *  | 6/1991 | Anderson ........... G06F 21/6227 713/176 |
| 6,047,067 A  *  | 4/2000 | Rosen .................... G06Q 20/02 235/379 |
| 6,976,166 B2 | 12/2005 | Herley et al. |
| 7,436,792 B1 * | 10/2008 | Diamond ........... G06Q 30/0623 370/316 |
| 8,126,139 B2 | 2/2012 | Rose et al. |
| 2001/0019614 A1* | 9/2001 | Madoukh .......... G06F 17/30067 380/277 |
| 2004/0122975 A1* | 6/2004 | Lennestal ............. H04L 63/065 709/245 |
| 2005/0081031 A1* | 4/2005 | Peterson ............. G06F 21/6218 713/165 |

(Continued)

FOREIGN PATENT DOCUMENTS

| KR | 10-0849639 B1 | 8/2008 |
| KR | 10-2011-0132422 A | 12/2011 |

OTHER PUBLICATIONS

European Search Report dated Sep. 2, 2016.

*Primary Examiner* — Michael S McNally
(74) *Attorney, Agent, or Firm* — Cha & Reiter, LLC

(57) ABSTRACT

An electronic device for encrypting content and a method thereof are provided. First and second data segments of a content file may be received. The first data segment may be encrypted on the basis of a policy of a content provider providing the content file. The second data segment may be encrypted using an encryption scheme that differs from that used for the first data segment. The second encryption scheme may utilized a different key and/or algorithm than that used in the first encryption scheme.

21 Claims, 11 Drawing Sheets

(56) References Cited

U.S. PATENT DOCUMENTS

| | | |
|---|---|---|
| 2005/0192904 A1 | 9/2005 | Candelore |
| 2005/0216413 A1 | 9/2005 | Murakami et al. |
| 2007/0083467 A1 | 4/2007 | Lindahl et al. |
| 2007/0116275 A1* | 5/2007 | Fadili .................. H04L 63/0428 380/46 |
| 2008/0082837 A1* | 4/2008 | Mattsson ............ G06F 21/6209 713/193 |
| 2012/0076300 A1 | 3/2012 | Uchida et al. |
| 2012/0246485 A1* | 9/2012 | Norimoto ........... G06F 21/6209 713/189 |

* cited by examiner

ELECTRONIC DEVICE AND METHOD FOR ENCRYPTING CONTENT

CLAIM OF PRIORITY

This application claims priority under 35 U.S.C. § 119(a) to Korean Application Serial Nos. 10-2015-0078744 & 10-2015-0119727, which were filed in the Korean Intellectual Property Office on Jun. 3, 2015 & Aug. 25, 2015, respectively, the entire content of which is hereby incorporated by reference.

TECHNICAL FIELD

Various embodiments of the present disclosure relate to a method, apparatus and computer readable recording medium for encrypting content.

BACKGROUND

Generally, when an electronic device downloads content, a server providing the content may encrypt it using a specific encryption key. Once the server transmits the encrypted content and the encryption key to the electronic device, the electronic device may decrypt the encrypted content using the encryption key and then output the decrypted content on a display. In some cases, the content is transmitted from the server to the electronic device unencrypted, and the electronic device is configured to automatically encrypt the content prior to storage thereof in memory, so as to prevent the end user from making unauthorized copies. (Herein, the electronic device receiving the content may also be referred to as an end user device.)

Various encryption methods may be used by the server or electronic device to encrypt a content file. The electronic device may encrypt the content file using an encryption key and an encryption form which are defined in a Digital Rights Management (DRM) protocol, or encrypt the content file using an encryption algorithm such as an Advanced Encryption Standard (AES) or Data Encryption Standard (DES).

When an encryption key table managed by the server or electronic device is transferred to an unauthorized electronic device together with the encrypted content file, the unauthorized electronic device may decode and use the encrypted content file using the encryption key table.

SUMMARY

In the prior art, when the electronic device has received the encrypted content file and the encryption key using the encryption algorithm, the electronic device may decrypt the encrypted content file using the encryption key. However, since each content file is typically encrypted using a single encryption key, it is possible for the content file to be shared with an unauthorized user or hacker when the encryption key is exposed.

According to various embodiments of the present disclosure, a content encryption method of an electronic device using one or more encryption schemes when the content file is encrypted, and an electronic device thereof are provided.

In accordance with an aspect of the present disclosure, there is provided an encryption method by an electronic device. The encryption method may include: receiving a first data segment of a content file through a network; encrypting the first data segment using a first encryption key on the basis of a policy of a content provider providing the content file; receiving a second data segment of the content file; and encrypting the second data segment using a second encryption key.

In accordance with another aspect of the present disclosure, an electronic device may include: a communication interface that receives a first data segment of a content file through a network and receives a second data segment of the content file; and a processor configured to encrypt the first data segment using a first encryption key on the basis of a policy of a content provider providing the content file and to encrypt the second data segment using a second encryption key.

In various embodiments of the present disclosure, since the electronic device receives the content file and encrypts data segments of the content file on the basis of a policy of a content provider, the burden on the content providing server is reduced since the server need not transmit encryption keys or manage the key table for encryption and decryption.

Further, in various embodiments of the present disclosure, a plurality of data segments of the content file are encrypted using different encryption keys and algorithms and are stored in different storage mediums so that content security can be enhanced.

Also, in an embodiment of the present disclosure, a decrypting method involves decrypting a previous sub-file to decrypt a plurality of data segments of the content file, and then decrypting a next sub-file using encryption information of the next sub-file related to at least a part of the decrypted previous sub-file. As a result, complexity of security for the content file increases, thereby minimizing the risk of hacking by hackers or crackers (i.e., malicious hackers).

BRIEF DESCRIPTION OF THE DRAWINGS

The above and other aspects, features, and advantages of the present disclosure will be more apparent from the following detailed description taken in conjunction with the accompanying drawings, in which like reference numerals depict like elements or features, in which.

DETAILED DESCRIPTION

Figure 1:
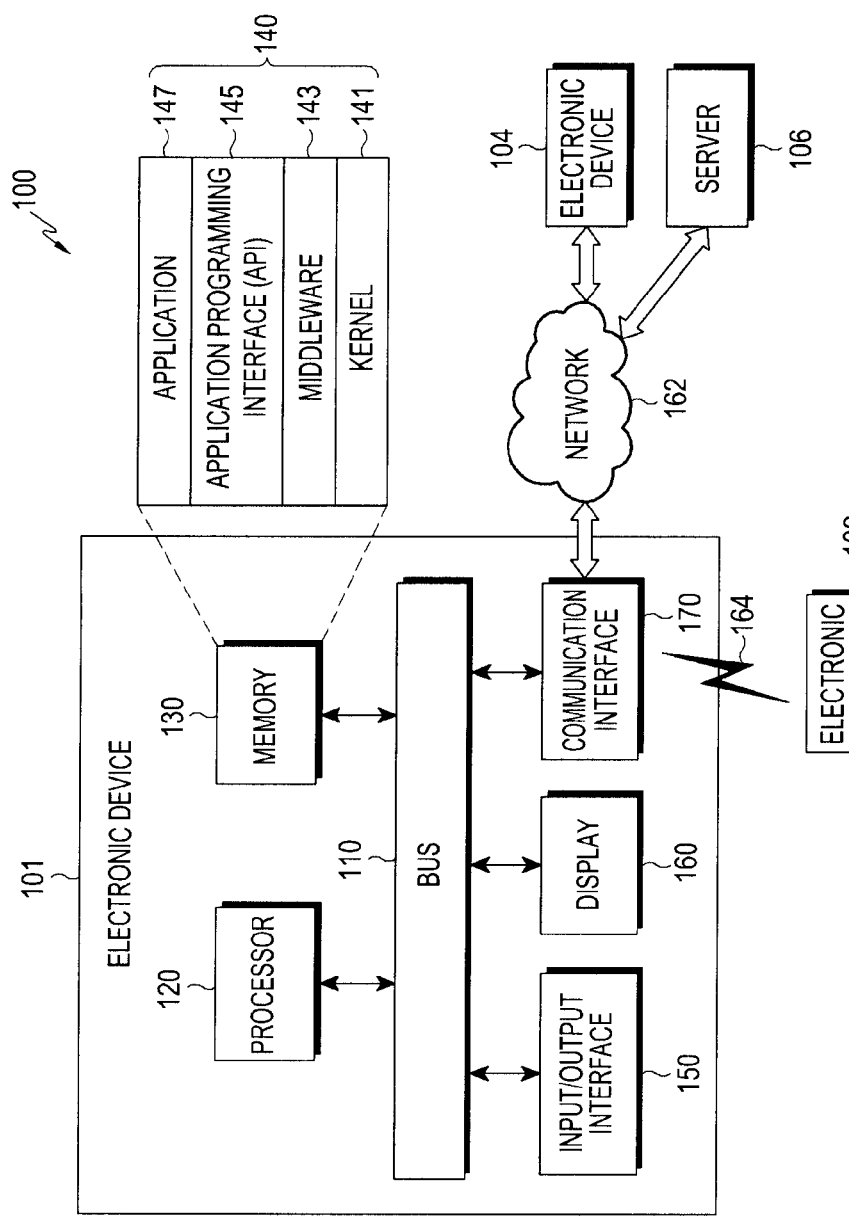
FIG. 1 illustrates a network environment 100 including an electronic device according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. In the present disclosure, the term "user" may indicate a person using an electronic device or a device (e.g. an artificial intelligence electronic device) using an electronic device.

The electronic device 101 in a network environment 100 according to various embodiments will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit which interconnects the elements 110 to 170 and delivers communication (for example, a control message and/or data) between the elements 110 to 170.

The processor 120 may include one or more of a Central Processing Unit (CPU), an Application Processor (AP), and a Communication Processor (CP). For example, the processor 120 may carry out operations or data processing relating to control and/or communication of at least one other element of the electronic device 101.

The memory 130 may include a volatile memory and/or a non-volatile memory. The memory 130 may store, for example, instructions or data related to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

For example, the kernel 141 may control or manage system resources (for example, the bus 110, the processor 120, and the memory 130) which are used to execute an operation or a function implemented in the other programs (for example, the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143 may serve, for example, as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or like) of the electronic device 101 to at least one of the application programs 147. For example, the middleware 143 may perform scheduling or load balancing on the one or more task requests by processing the one or more task requests according to the priorities assigned thereto.

The API 145 corresponds to an interface for controlling a function provided in the kernel 141 or the middleware 143 by the application program 147, and may include at least one interface or function (e.g., instructions) for a file control, a window control, an image process, and a character control.

The input/output interface 150 may function as, for example, an interface that may transfer instructions or data input from a user or another external device to the other element(s) of the electronic device 101. Also, the input/output interface 150 may output instructions or data received from other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 may display, for example, various types of contents (for example, text, images, videos, icons, or symbols) to the user. The display 160 may include a touch screen and receive, for example, a touch input, a gesture input, a proximity input, or a hovering input using an electronic pen or a user's body part.

The communication interface 170 may establish communication between, for example, the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. Further, the wireless communication may include the short-range communication 164. The short-range communication 164 may include at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of communication networks such as a computer network (for example, a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed by the electronic device 101 may be performed by another electronic device or a plurality of electronic devices (for example, the electronic devices 102 and 104 or the server 106). According to an embodiment, when the electronic device 101 has to perform a function or service automatically or in response to a request, the electronic device 101 may request another device (e.g., the electronic devices 102 and 104 or the server 106) to perform at least some functions relating thereto, instead of autonomously or additionally performing the function or service. Another electronic device (e.g., the electronic devices 102 and 104 or the server 106) may execute the requested functions or the additional functions, and may deliver a result of the execution to the electronic device 101. The electronic device 101 may provide the received result as it is or additionally process the result and provide the requested functions or services. To achieve this, for example, cloud computing, distributed computing, or client-server computing technology may be used.

Figure 2:
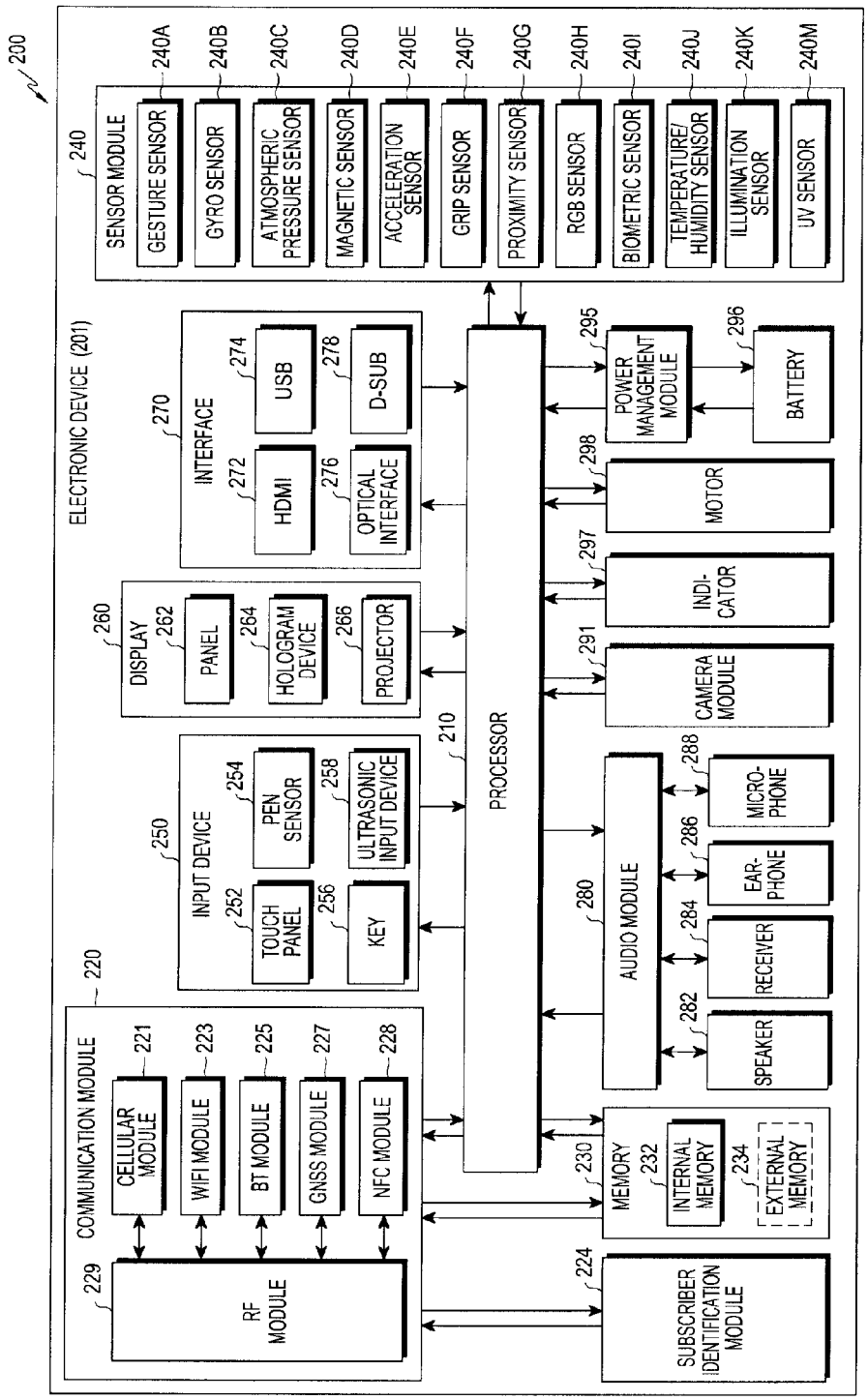
FIG. 2 is a block diagram illustrating an electronic device according to various embodiments.

FIG. 2 is a block diagram of an electronic device 201 according to various embodiments. An electronic device 201 may include, for example, all or some of the elements of the electronic device 101 illustrated in FIG. 1. The electronic device 201 may include at least one Application Processor (AP) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware or software elements connected to the processor 210 by running, for example, an Operation System (OS) or an application program, and may perform processing of and arithmetic operations on various data. The processor 210 may be implemented by, for example, a System on Chip (SoC). According to an embodiment, the processor 210 may further include a Graphic Processing Unit (GPU) and/or an image signal processor. The processor 210 may also include at least some (e.g., a cellular module 221) of the elements illustrated in FIG. 2. The processor 210 may load, into a volatile memory, instructions or data received from at least one (for example, a non-volatile memory) of the other elements and may process the loaded instructions or data, and may store various data in a non-volatile memory.

The communication module 220 may have a configuration identical or similar to that of the communication interface 170 illustrated in FIG. 1. The communication module 220 may include, for example, a cellular module 221, a Wi-Fi module 223, a Bluetooth module 225, a GNSS module 227 (e.g., a GPS module, a Glonass module, a Beidou module, or a Galileo module), an NFC module 228, and a Radio Frequency (RF) module 229.

The cellular module 221 may provide a voice call, an image call, a text message service, or an Internet service through, for example, a communication network. According to an embodiment, the cellular module 221 may identify and authenticate the electronic device 201 within a communication network using a subscriber identification module (for example, the SIM card 224). According to an embodiment, the cellular module 221 may perform at least some of the functions that the AP 210 may provide. According to an embodiment, the cellular module 221 may include a communication processor (CP).

The Wi-Fi module 223, the Bluetooth module 225, the GNSS module 227, or the NFC module 228 may include, for example, a processor that processes data transmitted and received through the corresponding module. In some embodiments, at least some (two or more) of the cellular module 221, the Wi-Fi module 223, the Bluetooth module 225, the GNSS module 227, and the NFC module 228 may be included in a single Integrated Chip (IC) or IC package.

The RF module 229 may transmit/receive, for example, a communication signal (for example, an RF signal). The RF module 229 may include, for example, a transceiver, a Power Amp Module (PAM), a frequency filter, a Low Noise Amplifier (LNA), or an antenna. According to another embodiment, at least one of the cellular module 221, the Wi-Fi module 223, the Bluetooth module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard drive, or a Solid State Drive (SSD).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), Multi-Media Card (MMC), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, the microphone 288) and identify data corresponding to the detected ultrasonic waves.

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram device 264 may show a three dimensional image in the air by using an interference of light. The projector 266 may display an image by projecting light onto a screen. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery 296 or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may indicate a particular state (for example, a booting state, a message state, a charging state, or the like) of the electronic device 201 or a part (for example, the processor 210). The motor 298 may convert an electrical signal into mechanical vibration, and may generate vibration, a haptic effect, or the like. Although not illustrated, the electronic device 201 may include a processing unit (for example, a GPU) for supporting a mobile television (TV). The processing unit for supporting mobile TV may, for example, process media data according to a certain standard such as Digital Multimedia Broadcasting (DMB), Digital Video Broadcasting (DVB), or mediaFlo™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
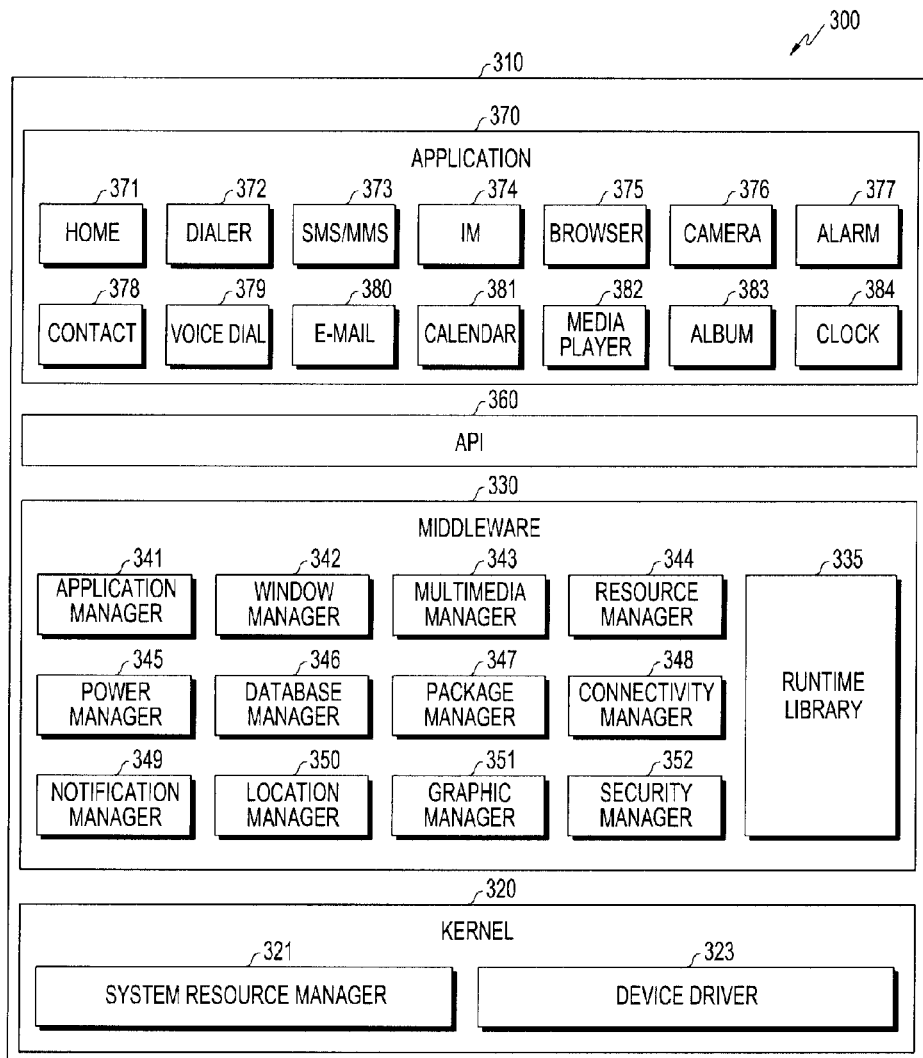
FIG. 3 is a block diagram illustrating a programming module according to various embodiments.

FIG. 3 is a block diagram of a program module according to various embodiments. According to an embodiment, the program module 310 (for example, the program 140) may include an Operating System (OS) for controlling resources related to an electronic device (for example, the electronic device 101) and/or various applications (for example, the application program 147) executed in the operating system. The operating system may be, for example, Android, iOS, Windows, Symbian, Tizen, Bada, or the like.

The program module 310 may include a kernel 320, middleware 330, an Application Programming Interface (API) 360, and/or applications 370. At least a part of the program module 310 can be preloaded in the electronic device or be downloaded from an external electronic device (e.g., the electronic devices 102 and 104, or a server 106).

The kernel 320 (for example, the kernel 141) may include, for example, a system resource manager 321 and/or a device driver 323. The system resource manager 321 may control, assign, or collect system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function commonly required by the applications 370, or may provide various functions to the applications 370 through the API 360 so that the applications 370 can efficiently use limited system resources within the electronic device. According to an embodiment, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the applications 370 are executed. The runtime library 335 may perform input/output management, memory management, or a function for an arithmetic function.

The application manager 341 may, for example, manage a life cycle of at least one of the applications 370. The window manager 342 may manage Graphical User Interface (GUI) resources used on a screen. The multimedia manager 343 may identify formats required for the reproduction of various media files and encode or decode a media file using a codec suitable for the corresponding format. The resource manager 344 may manage resources of at least one of the applications 370, such as a source code, a memory, and a storage space.

The power manager 345 may operate together with, for example, a Basic Input/Output System (BIOS) to manage a battery or power and may provide power information required for the operation of the electronic device. The database manager 346 may generate, search, or change a database to be used in at least one of the applications 370. The package manager 347 may manage the installation or the updating of an application distributed in the form of a package file.

The connectivity manager 348 may manage a wireless connection such as, for example, Wi-Fi or Bluetooth. The notification manager 349 may display or notify of an event, such as an arrival message, an appointment, proximity notification, and the like, in such a manner of not disturbing a user. The location manager 350 may manage location information of the electronic device. The graphic manager 351 may manage a graphic effect to be provided to a user and a user interface relating to the graphic effect. The security manager 352 may provide all security functions required for system security or user authentication. According to an embodiment, when the electronic device (e.g., the electronic device 101) has a telephone call function, the middleware 330 may further include a telephony manager that manages a voice or video call function of the electronic device.

The middleware 330 may include a middleware module that forms combinations of various functions of the above described elements. The middleware 330 may provide modules specialized according to the type of operating system in order to provide differentiated functions. Furthermore, the middleware 330 may dynamically remove some of the existing elements, or may add new elements.

The API 360 (for example, the API 145), which is a set of API programming functions, may be provided in a different configuration for each operating system. For example, with respect to each platform, one API set may be provided in a case of Android or iOS, and two or more API sets may be provided in a case of Tizen.

The applications 370 (for example, the application programs 147) may include, for example, one or more applications that can provide functions, such as home 371, a dialer 372, SMS/MMS 373, an Instant Message (IM) 374, a browser 375, a camera 376, an alarm 377, contacts 378, voice dial 379, an email 380, a calendar 381, a media player 382, an album 383, a clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of description) supporting information exchange between the electronic device (for example, the electronic device 101) and an external electronic device (for example, the electronic devices 102 and 104). The information exchange application may include, for example, a notification relay application for transferring specific information to an external electronic device or a device management application for managing an external electronic device.

For example, the notification relay application may include a function of transferring, to the external electronic device (for example, the electronic devices 102 and 104), notification information generated from other applications of the electronic device 101 (for example, an SMS/MMS application, an e-mail application, a health management application, or an environmental information application). Further, the notification relay application can, for example, receive notification information from the external electronic device and provide the received notification information to a user.

The device management application may manage (for example, install, delete, or update), for example, at least one function of an external electronic device (for example, the electronic devices 102 and 104) communicating with the electronic device (for example, a function of turning on/off the external electronic device itself (or some components) or a function of adjusting luminance (or resolution) of the display), applications operating in the external electronic device, or services provided by the external electronic device (for example, a call service and a message service).

According to an embodiment, the applications 370 may include applications (e.g., a health care application of a mobile medical appliance, etc.) designated according to the attributes of an external electronic device (e.g., the electronic devices 102 and 104). According to an embodiment, the applications 370 may include applications received from an external electronic device (e.g., the server 106 or the electronic devices 102 and 104). According to an embodiment, the applications 370 may include a preloaded application or a third party application that may be downloaded from a server. The names of the components of the program module 310 according to the illustrated embodiment may vary according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by instructions stored in a non-transitory computer-readable storage medium in a programming module form. The instructions, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Figure 4:
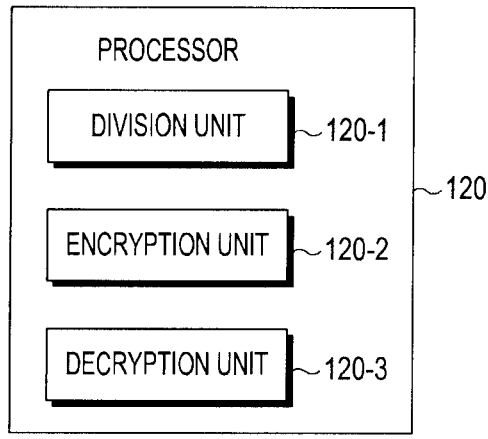
FIG. 4 is a block diagram illustrating a detailed configuration of a processor according to various embodiments.

FIG. 4 is a block diagram illustrating a detailed configuration of a processor which may be part of an end user electronic device according to various embodiments. Processor 120 may include a division unit 120-1 for dividing a received content file, an encryption unit 120-2 for encrypting the divided content file, and a decryption unit 120-3 for decrypting the encrypted content file. As used herein, a "content file" may contain any of various types of media content such as text, images, video and/or audio. A content file may be an entire unit of content such as an entire word processing document, an entire video from beginning to end, an entire movie, an entire song, etc.

The processor 120 may receive the content file through the communication interface 170 from a content providing server according to a content download request. The content file may be received from the server in an unencrypted state. Alternatively, the content file is received encrypted, and the encryption performed by the electronic device as described below may provide an additional layer of encryption. When the content file has been received, the processor may divide the received content file into a plurality of sub-files, encrypt the plurality of divided sub-files, and store the encrypted sub-files in the memory 130. According to an embodiment, when sub-files have been received in a size designated by the content providing server or by processor 120, sub-files may be encrypted by processor 120 and stored in the memory 130. According to an embodiment, the content providing server may identify whether the electronic device requesting a content download corresponds to an authorized electronic device, and if so, transmit the content file to the electronic device.

According to an embodiment, the plurality of sub-files may be a plurality of respective data segments of the content file. Herein, the terms "sub-file" and "data segment" may be used interchangeably.

When the content file has been received from the content providing server, which provides the content file, the processor 120 may identify encryption policy information and control the encryption unit 120-2 so as to perform encryption for the content file on the basis of the identified encryption policy information.

According to an embodiment, the encryption policy information may have been downloaded from a content provider and stored in the memory 130. Alternatively, the encryption policy information may be provided together with the content file. For example, the encryption policy information may define an encryption scheme which depends on one or more of a performance characteristic (or a capacity) of the electronic device 101 or the content service country. The encryption policy information may further include division size information according to a size designated for each size of the content file, information on a storage medium (or a storage location) of the divided sub-files such as an internal memory, an external memory, and cloud storage, information on an encryption algorithm applied to encrypt the content file, and information on whether a cache area where the content file is temporarily stored should be an encrypted area.

According to an embodiment, the processor 120 may determine a division size for the content file on the basis of the encryption policy information. Processor 120 may control the division unit 120-1 in order to divide the content file such that the plurality of sub-files are sequentially arranged in the determined division size. For example, when the division size information designated according to the content service country corresponds to a division size having a length of a reproduction time of three minutes, the processor 120 may divide the content file into sub-files that each represent three minutes of reproduction time.

According to an embodiment, the processor 120 may define a division reference for dividing the content file, on the basis of the content reproduction time related to a license or as randomly defined by a user. For example, when the division size information designated in the license related to the content corresponds to a division size having a length of reproduction time of one minute, the processor 120 may divide the content file into sub-files that each representing one minute of content.

According to an embodiment, the processor 120 may define the division reference for dividing the content file according to a connection scheme of the network 162. For example, when the connection scheme of the network 162 corresponds to a connection by a wired LAN, the processor 120 may define the division reference as a division size larger than that for a connection scheme of a wireless LAN.

According to an embodiment, the processor 120 may define a division size of the content file according to a state of the network 162. For example, a larger division size may be used when a higher quality signal is available. Thus the division size may be determined at least in part on the basis of signal intensity of the network 162. If a signal with weak electric field intensity is received, processor 120 may define a smaller division size as compared to a division size for the case of a strong signal.

According to an embodiment, the processor 120 may control the encryption unit 120-2 to generate encryption information for encrypting a content file divided into the plurality of sub-files on the basis of the encryption policy information. Such encryption information may include the encryption key, an encryption algorithm, and a storage location of the encrypted file.

According to an embodiment, the processor 120 may combine "applied data" and unique data of a first sub-file and then generate a sub-encryption key, where "applied data" may refer generally to reproducible data of the content file, e.g., video data, audio data, etc. In the following discussion, such applied data is used to generate an encryption key and may be some or all of the data contained within the relevant sub-file. The processor may generate an encryption key of a second sub-file by encrypting a sub encryption key. The first sub-file may be a sub-file among the plurality of sub-files arranged in a sequence, and the second sub-file may be a sub-file disposed adjacent to the first sub-file in the sequence. The unique data may be at least one ID of a unique ID and a track ID of the electronic device 101. The sub encryption key may be a seed used to generate the encryption key of the second sub-file.

According to an embodiment, the processor 120 may generate the encryption key of the second sub-file on the basis of the applied data of the first sub-file.

According to an embodiment, the processor 120 may calculate a result value for the applied data of the first sub-file using an algorithm determination scheme, and determine an encryption algorithm for being applied to the second sub-file, using the calculated result value. The algorithm determination scheme may be, for example, bit masking, arithmetic expression, or the like. For example, when a result value calculated by bit-masking the applied data of the first sub-file, is "0", the processor 120 may determine the encryption algorithm of the second sub-file as an AES algorithm, and, when the calculated result value is "1", the processor 120 may determine the encryption algorithm of the second sub-file as a DES algorithm. Information on an encryption algorithm configured correspondingly to the result value may be included in the encryption policy information and be provided.

According to an embodiment, the processor 120 may apply the same encryption algorithm to each of the plurality of sub-files, or apply different algorithms. According to an embodiment, the processor 120 may determine the encryption algorithm on the basis of particular information, such as an encryption algorithm application order. According to an embodiment, the processor 120 may determine the encryption algorithm or randomly decide or change an order of applying the algorithm.

According to an embodiment, the processor 120 may calculate a result value for the applied data of the first sub-file using the storage position determination scheme, and determine a storage position of the second sub-file, using the calculated result value. The storage position determination scheme may be bit masking, arithmetic expression, or the like.

For example, when a result value calculated by subtracting a specific value from the applied data of the first sub-file is "0", the processor 120 determines the storage position of the second sub-file as the internal memory. When the calculated result value is "1", the processor 120 may determine the storage position of the second sub-file as the external memory. Information on a storage position configured correspondingly to the result value may be included in the provided encryption policy information. Of course, the result values exemplified above are not limited to a specific value, and may be various values.

According to an embodiment, the processor 120 may control the encryption unit 120-2 so as to encrypt at least one of the plurality of sub-files using the generated encryption information. For example, the processor 120 may encrypt the second sub-file using the generated encryption key and the determined encryption algorithm of the second sub-file, and store the encrypted second sub-file in the determined storage position.

According to an embodiment, the processor 120 may simultaneously encrypt each of the plurality of sub-files or encrypt, in forward or reverse order, the plurality of sequentially arranged sub-files.

According to an embodiment, when the first sub-file corresponds to a sub-file disposed at the front-most position in the order, since the first sub-file has been decrypted first, the processor 120 may encrypt or may not encrypt the first sub-file, so that when the content file is subsequently reproduced, the first sub-file may be quickly decrypted or just quickly reproduced without the necessity of decryption.

For example, when encrypting the first sub-file, the processor 120 may encrypt the first sub-file using encryption information of the first sub-file provided from the content providing server. An encryption key of the first sub-file may be an encryption key, such as a public key, which can easily be shared, and the encryption algorithm may be an encryption algorithm, such as a single XOR operation, which can easily and quickly decrypt.

According to an embodiment, the encryption information of the first sub-file may be stored in a storage such as an internal memory, an external memory, or a cloud storage.

According to an embodiment, the processor 120 may control the decryption unit 120-3 to decrypt the second sub-file on the basis of the at least a part of data, i.e., the aforementioned "applied data", of the first sub-file.

For example, when the first sub-file has been encrypted, the processor 120 may decrypt the first sub-file using encryption information of the first sub-file. The processor may generate a sub encryption key by combining the applied data of the first sub-file and unique data used to generate the encryption key, and generate an encryption key of the second sub-file by encrypting the generated sub encryption key.

According to an embodiment, the processor 120 may calculate a result value for the applied data of the first sub-file using an algorithm determination scheme, and determine an encryption algorithm applied to the second sub-file, using the calculated result value.

For example, when a result value calculated by bit-masking the applied data is "0", the processor 120 determines the encryption algorithm applied to the second sub-file as an AES algorithm.

According to an embodiment, the processor 120 may calculate a result value for the applied data of the first sub-file using the storage position determination scheme, and determine a storage position where the second sub-file is stored, using the calculated result value.

According to an embodiment, the processor 120 may identify a position of the second sub-file encrypted using the determined storage position and decrypt the second sub-file using the generated encryption key and the determined encryption algorithm.

According to an embodiment, when the first sub-file has not been encrypted, the processor 120 may decrypt the second sub-file encrypted using the encryption information of the second sub-file related to the applied data of the first sub-file.

The division unit 120-1 may divide the content file into the plurality of sub-files to be sequentially arranged on the basis of the division size information of the encryption policy information.

The encryption unit 120-2 may generate encryption information related to each of the plurality of sub-files and encrypt each of the sub-files using the generated encryption information. The encryption unit 120-2 may encrypt or may not encrypt a sub-file corresponding to a random number among the plurality of sub-files.

For example, the encryption unit 120-2 may generate, in order to encrypt a content file divided into two sub-files, a sub encryption key by combining the applied data of the first sub-file and unique data used to generate the encryption key, and generate an encryption key of the second sub-file disposed next to the first sub-file by encrypting the generated sub-encryption key.

The encryption unit 120-2 may determine an encryption algorithm to be applied to the second sub-file using the algorithm determination scheme, and generate encryption information of the second sub-file including information on the generated encryption key and the determined encryption algorithm. The encryption unit 120-2 may encrypt the second sub-file using the encryption information of the second sub-file. In some examples the encryption unit 120-2 encrypts the first sub-file. In other examples the encryption unit does not encrypt the first sub-file. When encrypting the first sub-file, the encryption unit may encrypt the first sub-file using an encryption key such as a public key and a simple encryption algorithm such as an XOR algorithm.

The encryption unit 120-2 may simultaneously perform encryption for the first sub-file and the second sub-file.

The encryption unit 120-2 may determine a storage position for the second sub-file using the storage position determination scheme, and store the encrypted second sub-file in the determined storage position.

The decryption unit 120-3 may decrypt the second sub-file using the encryption information of the first sub-file related to the at least part of data of the second sub-file. Here, the encryption information may also be referred to as "decryption information" (since such information is used for decryption).

For example, when the decryption unit 120-3 does not encrypt the first sub-file, the encryption unit 120-3 may generate the sub encryption key by combining the applied data of the first sub-file and the unique data, and generate an encryption key of the second sub-file by encrypting the generated sub encryption key.

The decryption unit 120-3 may calculate a result value for the applied data of the first sub-file using an algorithm determination scheme, and determine an encryption algorithm applied to the second sub-file, using the calculated result value.

The decryption unit 120-3 may calculate a result value for the applied data using the storage position determination scheme, and determine a storage position where the second sub-file is stored, using the calculated result value.

The decryption unit 120-3 may identify a position of the second sub-file encrypted using the determined storage position and decrypt the second sub-file using the generated encryption key and the determined encryption algorithm.

According to various embodiments of the present disclosure, the electronic device may include a communication interface for receiving a first data segment of a content file through a network, and receiving a second data segment of the content file; and a processor for encrypting the first data segment on the basis of a policy of a content provider providing the content file, and encrypting the second data segment.

Figure 5:
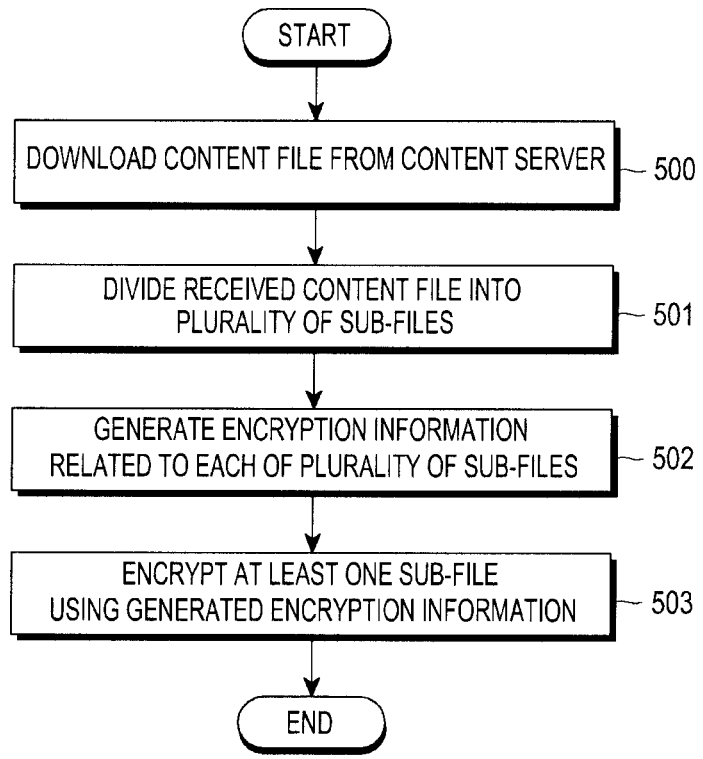
FIG. 5 is a flowchart illustrating a process of performing encryption by a processor according to various embodiments.

FIG. 5 is a flowchart illustrating a process of performing encryption by a processor 120 of an end user electronic device according to various embodiments.

In operation 500, the processor 120 may download the content file from the content server through the communication interface 170. The processor 120 may download encryption policy information together with the content file.

In operation 501, the processor 120 may divide the received content file into a plurality of sub-files. For example, the processor 120 may determine a division size with reference to the encryption policy information downloaded together with the content file, and divide the content file into the plurality of sub-files to be sequentially arranged according to the determined division size.

In operation 502, the processor 120 may generate encryption information related to at least one sub-file among the plurality of sub-files. For example, the processor 120 may generate an encryption key of a second sub-file using at least part of data (the afore-mentioned "applied data") of a first sub-file, determine an encryption algorithm of the second sub-file, and determine a storage place for storing the second sub-file. The processor 120 may generate encryption information of the second sub-file including the generated encryption key and the determined encryption algorithm.

In operation 503, the processor 120 may encrypt at least one sub-file among the plurality of sub-files using the generated encryption information. For example, the processor 120 may encrypt the second sub-file using the encryption information of the second sub-file, and encrypt the first sub-file using encryption information of the first sub-file.

In various embodiments of the present disclosure, one or more sub-files designated by a random number is determined, and the processor 120 does not encrypt these sub-files designated by the random number. For example, the processor 120 may generate the encryption information of a subsequently disposed sub-file, using the applied data of a sub-file disposed at the front-most position, and then may not encrypt the sub-file disposed at the front-most position.

Figure 6:
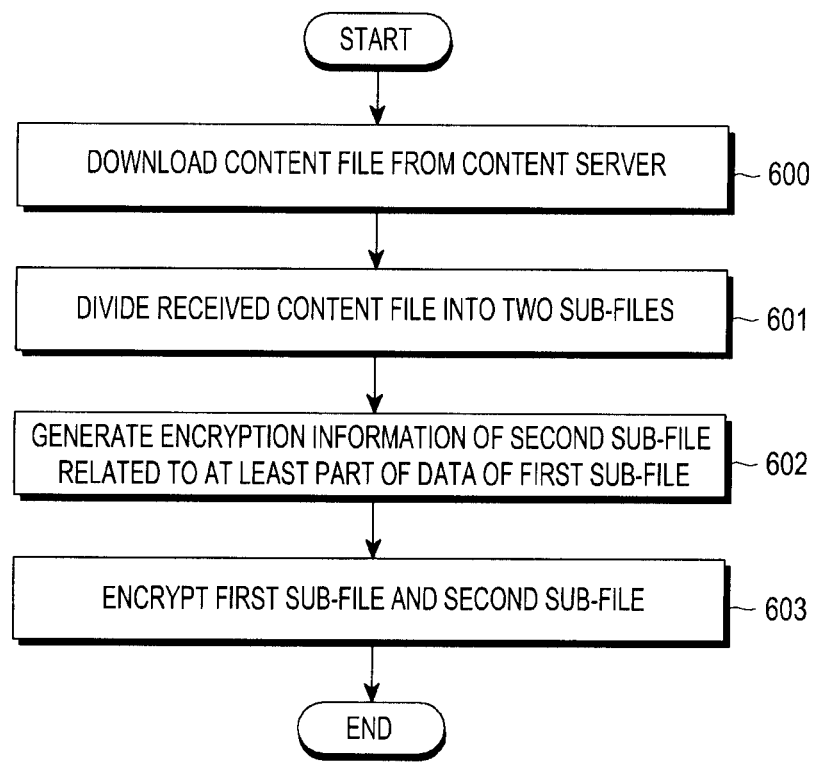
FIG. 6 is a flowchart illustrating a process of encrypting a content file which is divided into two sub-files by the processor according to various embodiments.

FIG. 6 is a flowchart illustrating a process of encrypting a content file which is divided into two sub-files by a processor according to various embodiments.

In operation 600, the processor 120 may download a content file from the content server through the communication interface 170.

In operation 601, the processor 120 may divide the downloaded content file into two sub-files. For example, the processor 120 may determine a division size with reference to encryption policy information provided by a content provider, and divide the content file into the two sub-files according to the determined division size.

In operation 602, the processor 120 may generate encryption information of a second sub-file related to at least part of a first sub-file. A method of generating an encryption key may use the same method as described in connection with FIG. 5.

In operation 603, the processor 120 may encrypt the first sub-file and the second sub-file. For example, the processor 120 may encrypt and store the second sub-file using encryption information of the second sub-file, and encrypt and store the first sub-file, in which the encryption information of the second sub-file is stored, using encryption information of the first sub-file. The processor 120 may encrypt the first sub-file using a relatively simple encryption algorithm such as a public key and an XOR algorithm. (This algorithm may consist of a single XOR operation applied to each pair of selected data bits.) The processor 120 may encrypt the second sub-file using an encryption algorithm identical to an algorithm used to encrypt the first sub-file or an algorithm more complex than the XOR algorithm such as AES, DES, RSA (rivest, shamir, and adleman) algorithms.

Figure 7A:
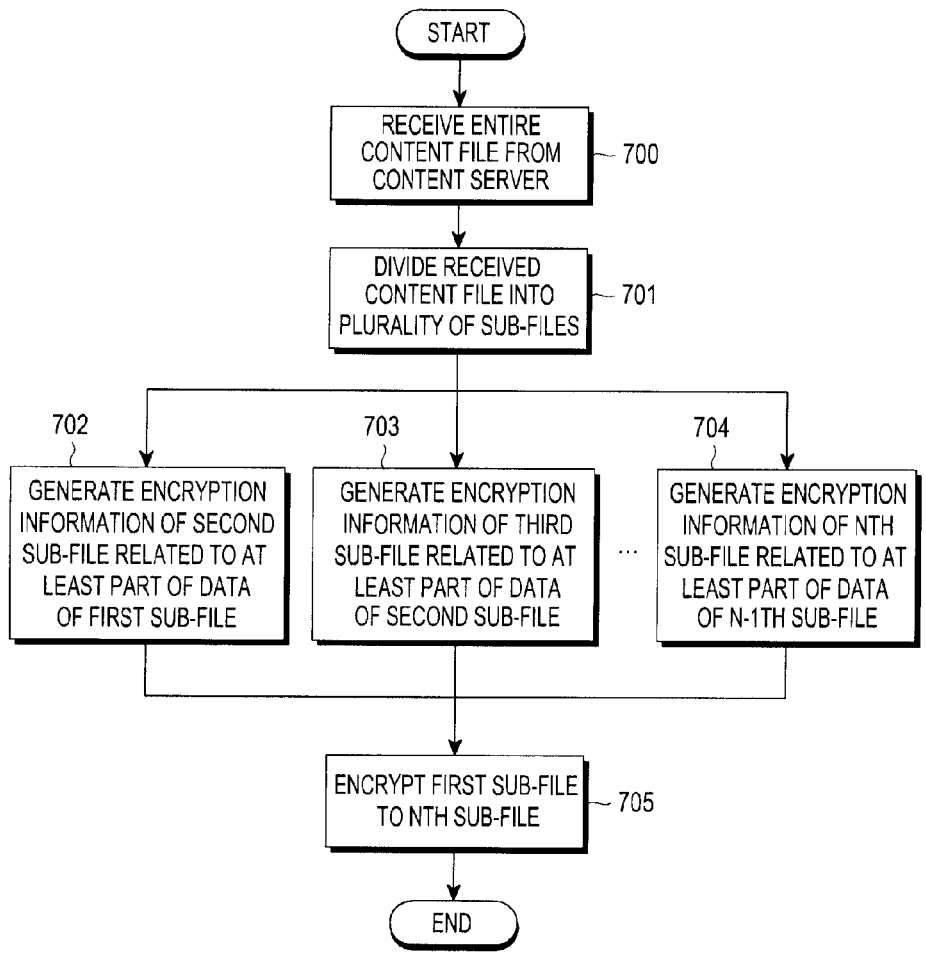
FIG. 7A and FIG. 7B are each flow charts illustrating a process of encrypting the content file by the processor according to various embodiments.
Figure 7B:
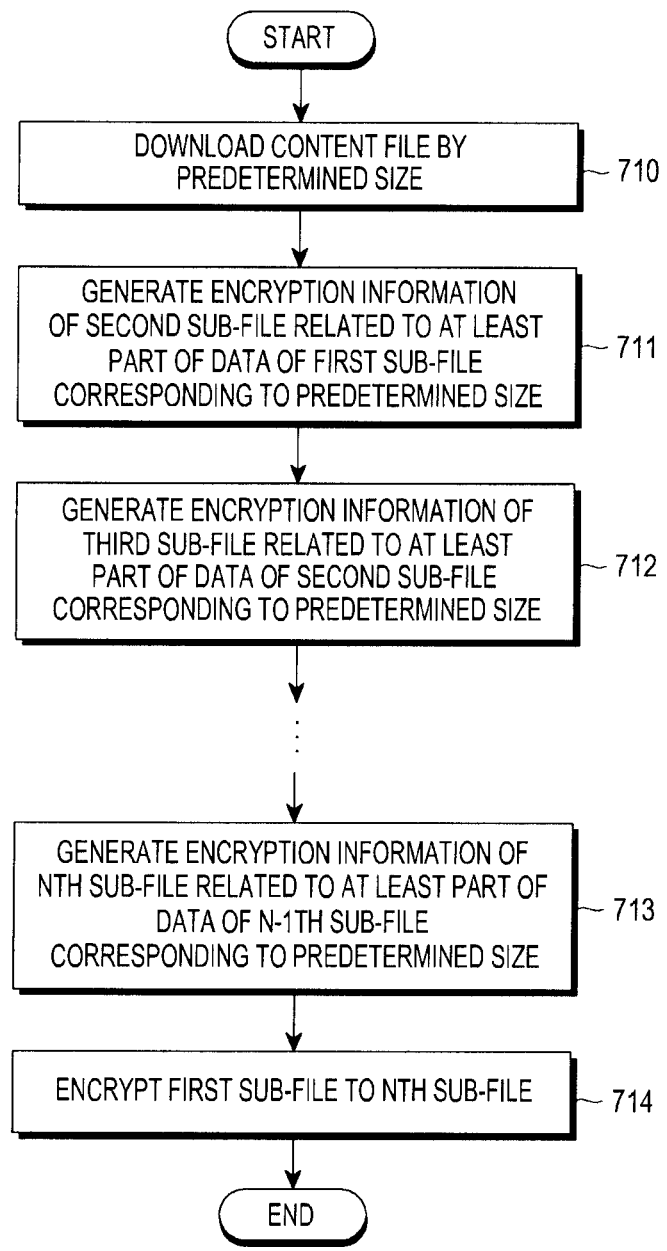

FIGS. 7A and 7B are flow charts illustrating a process of encrypting the content file by a processor of an end user electronic device according to various embodiments.

FIG. 7A is a flowchart illustrating an example process of downloading an entire content file and dividing the entire content file into a plurality of sub-files to encrypt the content file. In operation 700, the processor 120 may download (or receive) an entire content file from a content server through the communication interface 170. In operation 701, the processor 120 may divide the downloaded content file into a plurality N of sub-files. For example, the processor 120 may determine a division size with reference to the encryption policy information, and divide the content file into three or more sub-files to be sequentially arranged according to the determined division size. For instance, a first sub-file may be a beginning data segment of a media program represented by the content file; a second sub-file may be a succeeding data segment representing a temporally succeeding segment of the media program; and so forth.

In operation 702, the processor 120 may generate encryption information of a second sub-file related to at least part of a first sub-file. For example, the processor 120 may generate a sub encryption key for the second sub-file by combining the above-noted "applied data" of the first sub-file with unique data of the first sub-file, and generate an encryption key of the second sub-file by encrypting the generated sub encryption key. The processor 120 may calculate a result value for the applied data using an encryption algorithm determination scheme, and determine an encryption algorithm for encrypting the second sub-file, using the calculated result value.

In operation 703, the processor 120 may generate encryption information of a third sub-file related to at least part of the second sub-file. For example, the processor 120 may generate a sub encryption key for the third sub-file by combining the applied data of the second sub-file with unique data, and generate an encryption key of the third sub-file by encrypting the generated sub encryption key. The processor 120 may calculate a result value for the applied data of the second sub-file using an encryption algorithm determination scheme, and determine an encryption algorithm for encrypting the third sub-file, using the calculated result value.

In operation 704, the processor 120 may generate encryption information of an nth sub-file related to at least part of an (n−1)th sub-file. For example, the processor 120 may generate a sub encryption key for the nth sub-file by combining the applied data of the (n−1)th sub-file with unique data, and generate an encryption key of the nth sub-file by encrypting the generated sub encryption key. The processor 120 may calculate a result value for such applied data using an encryption algorithm determination scheme, and determine an encryption algorithm for encrypting the nth sub-file, using the calculated result value. In this case, n may be a natural number which is 4 or larger.

In operation 705, the processor 120 may encrypt the first sub-file to the nth sub-file.

For example, the processor 120 may encrypt the nth sub-file using the encryption information of the nth sub-file, and encrypt the (n−1)th sub-file using encryption information of the (n−1)th sub-file (or of the (n−2)th sub-file generated using applied data of the (n−2)th sub-file).

The processor 120 may encrypt the first sub-file using an encryption method, e.g., according to encryption policy information provided from the content server. The encrypted first to nth sub-files may be stored in each storage position determined through a storage position determination scheme. For example, all encrypted sub-files may be stored in the memory 130 or each of the encrypted sub-files may be stored in different storage mediums such as an internal memory, an external memory, or a cloud storage.

In the above example, the encryption operations for the plurality of sub-files are exemplarily performed in an order from the first sub-file to the nth sub-file; however, in alternative schemes, the first sub-file to the nth sub-file may be simultaneously encrypted, or the encryption is performed in an order from the nth sub-file to the first sub-file.

FIG. 7B is a flowchart illustrating an example process of encrypting a content file when the content file is downloaded in a predetermined size. In this case, one portion (in the predetermined size) of an entire content file may be downloaded at a time.

In operation 710, the processor 120 may download a portion of a content file in a predetermined size from a content server through the communication interface 170. In operation 711, the processor 120 may generate encryption information of a second sub-file related to at least part of a first sub-file corresponding to the predetermined size. According to an embodiment, the second sub-file may be at least part of a content file corresponding to the predetermined size, which is downloaded in a positional sequence succeeding the first sub-file.

In operation 712, the processor 120 may generate encryption information of a third sub-file related to at least part of a second sub-file corresponding to the predetermined size. According to an embodiment, the third sub-file may be at least part of a content file corresponding to the predetermined size, which is downloaded next to the second sub-file.

In operation 713, the processor 120 may generate encryption information of an nth sub-file related to at least part of a (n−1)th sub-file corresponding to the predetermined size. According to an embodiment, the nth sub-file may be at least part of a content file corresponding to the predetermined size, which is downloaded succeeding the (n−1)th sub-file. In this case, n may be a natural number which is 4 or larger.

In operation 714, the processor 120 may encrypt the first sub-file to the nth sub-file. For example, the processor 120 may encrypt the nth sub-file using encryption information of the nth sub-file, and encrypt the (n−1)th sub-file using encryption information of the (n−1)th sub-file.

Figure 8:
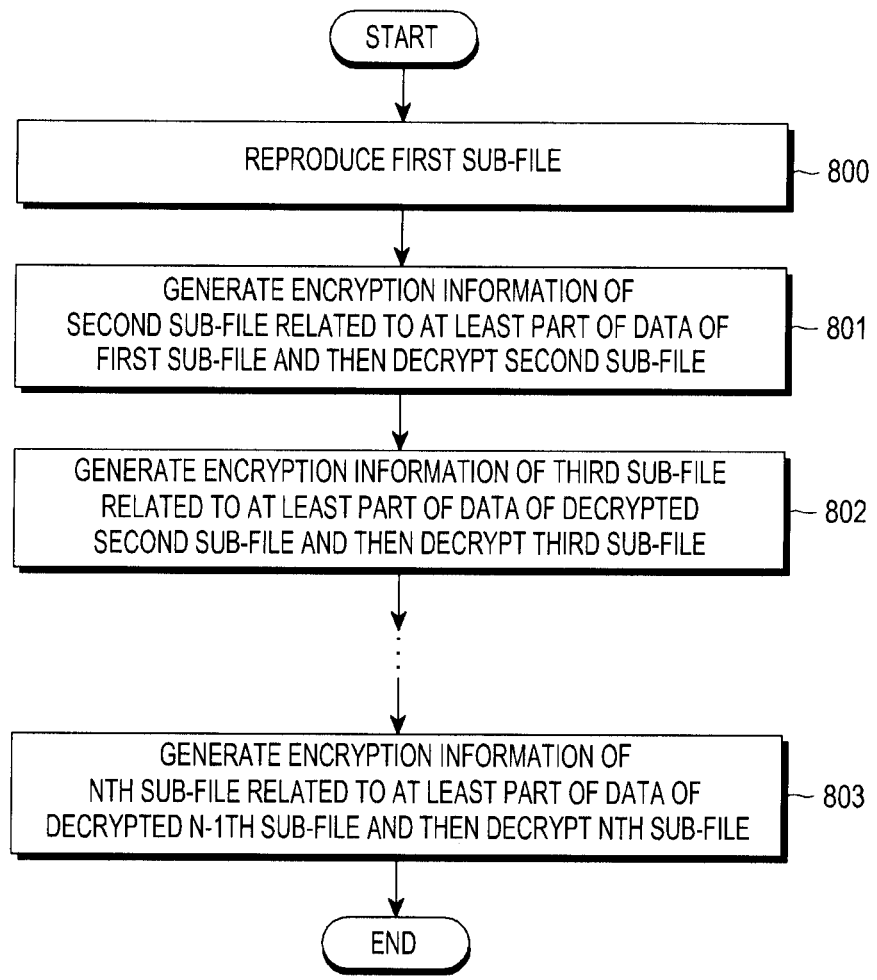
FIG. 8 is a flow chart illustrating a process of decrypting a content file, in which a first sub-file is not encrypted, by the processor according to various embodiments.

FIG. 8 is a flowchart illustrating a process performed by processor 120, of decrypting a content file, in which a first sub-file is not encrypted, according to various embodiments.

In operation 800, the processor 120 may reproduce the first sub-file and output the same through the display 160.

In operation 801, the processor 120 may generate encryption information of a second sub-file related to at least part of the first sub-file to decrypt the second encrypted sub-file.

In operation 802, the processor 120 may generate encryption information of a third sub-file related to at least part of the second sub-file to decrypt the third encrypted sub-file.

In operation 803, the processor 120 may generate encryption information of an nth sub-file related to at least part of the (n−1)th decrypted sub-file to decrypt the nth encrypted sub-file.

Figure 9:
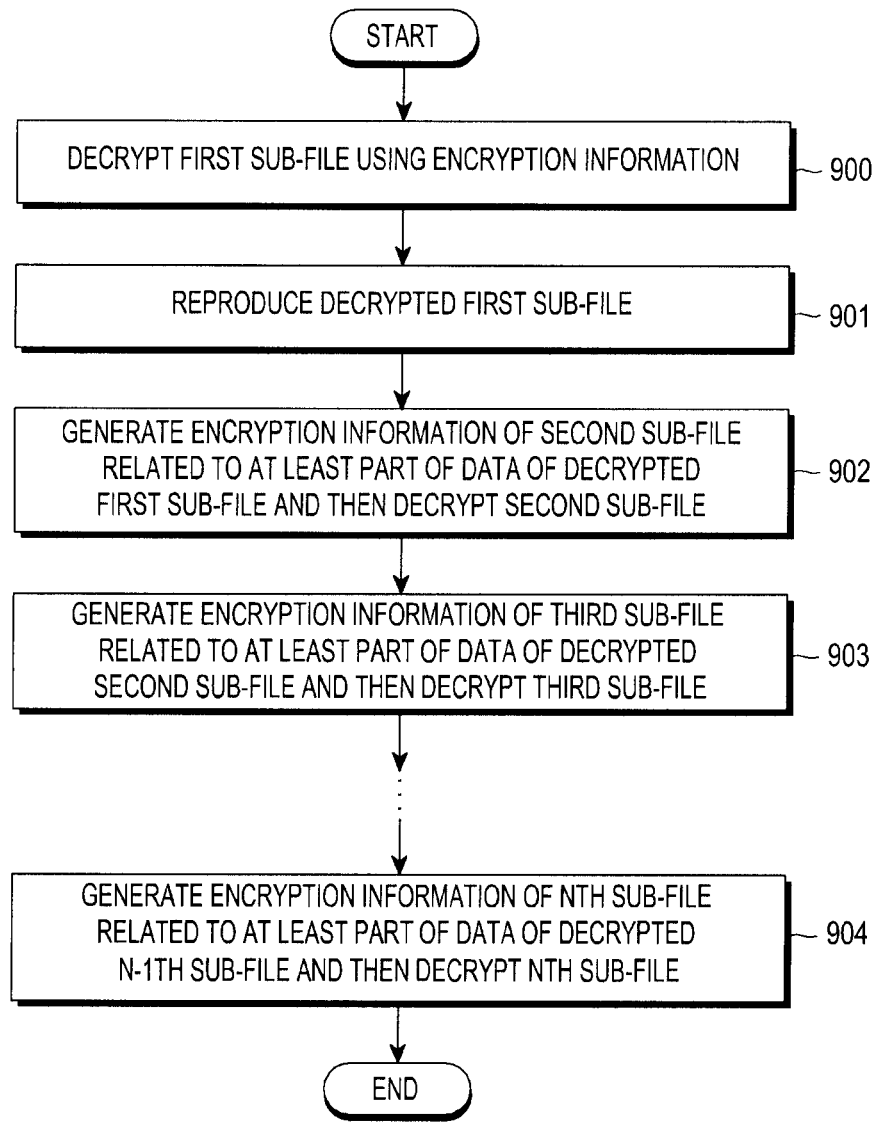
FIG. 9 is a flow chart illustrating a process of decrypting a content file, in which a first sub-file is encrypted, by the processor according to various embodiments.

FIG. 9 is a flowchart illustrating a process of decrypting a content file, in which a first sub-file is encrypted, by the processor according to various embodiments.

In operation 900, the processor 120 may decrypt the encrypted first sub-file using encryption information of the first sub-file. The encryption information of the first sub-file may include a public key and an XOR algorithm.

In operation 901, the processor 120 may reproduce the decrypted first sub-file and output the first sub-file through the display 160.

In operation 902, the processor 120 may generate encryption information of a second sub-file related to at least part of the first decrypted sub-file to decrypt the encrypted second sub-file.

In operations 903 and 904, the processor 120 may perform operations identical to the operations 802, 803 described in FIG. 8.

Figure 10A:
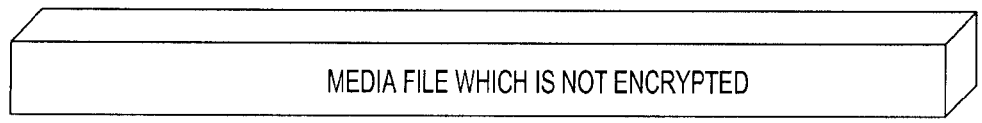
FIG. 10A illustrates an example of a content file which is not encrypted.
Figure 10B:
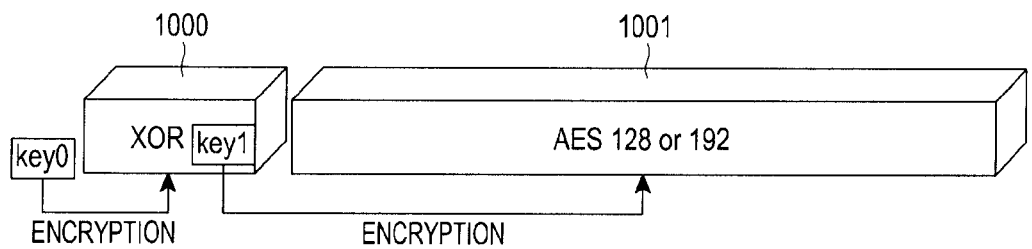
FIG. 10B illustrates an example of a process of encrypting the content file of FIG. 10A which is divided into two sub-files by the processor according to various embodiments.

FIGS. 10A and 10B collectively illustrate an example process of encrypting a content file which is divided into two sub-files by the processor according to various embodiments. FIG. 10A illustrates a media file which is not encrypted while FIG. 10B illustrates the encryption process. In this example, the processor 120 may receive, from a content providing server, a content file (or a media file) which is not encrypted as shown in FIG. 10A, divide the content file into two sub-files as shown in FIG. 10B, and encrypt each of the divided sub-files.

For example, the processor 120 may generate an encryption key (key0) of a first sub-file 1000, and determine an encryption algorithm (XOR) for encrypting the first sub-file 1000. The processor 120 may generate an encryption key (key1) of a second sub-file 1001 using a part of data of the first sub-file 1000, and determine an encryption algorithm (AES 128 or 192) for encrypting the second sub-file 1001.

The processor 120 may encrypt the second sub-file 1001 using the encryption key (key1) and the encryption algorithm (AES 128 or 192) of the second sub-file 1001, and encrypt the first sub-file 1000 using the encryption key (key0) and the encryption algorithm (XOR) of the first sub-file 1000. The processor 120 may simultaneously encrypt the first sub-file 1000 and the second sub-file 1001.

Figure 11:
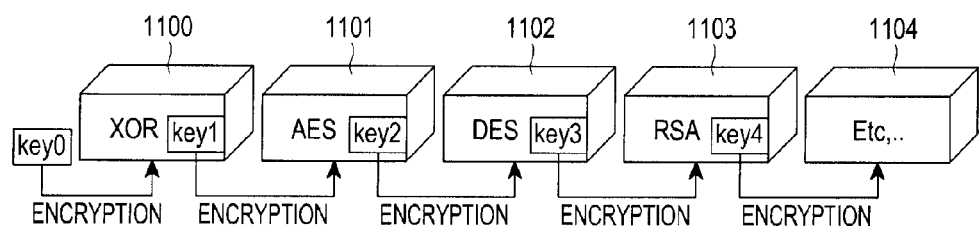
FIG. 11 illustrates an example of a process of encrypting a content file which is divided into a plurality of sub-files by the processor according to various embodiments.

FIG. 11 illustrates an example of a process of encrypting a content file which is divided into a plurality of sub-files by a processor of an end user electronic device according to various embodiments.

According to FIG. 11, when a content file, which is not encrypted, has been received from a content providing server, the processor 120 may divide the content file into five sequentially arranged sub-files and encrypt each of divided sub-files. More or fewer than five sequentially arranged sub-files may be employed in alternative examples.

For example, the processor 120 may generate an encryption key (key0) of a first sub-file 1100, and determine an encryption algorithm (XOR) for encrypting the first sub-file 1100. The processor 120 may generate an encryption key (key1) of a second sub-file 1101 using a part of data of the first sub-file 1100, and determine an encryption algorithm (AES) for encrypting the second sub-file 1101. An encryption algorithm of the first sub-file 1100 may be an encryption scheme which enables decryption to be faster than that expected for one or more of the second sub-file to a fifth sub-file. The encryption algorithm for the first sub-file may be simpler algorithm than that for each of the second through fifth sub-files.

The processor 120 may generate an encryption key (key2) of a third sub-file 1102 using a part of data of the second sub-file 1101, and determine an encryption algorithm (DES) for encrypting the third sub-file 1102.

The processor 120 may generate an encryption key (key3) of a fourth sub-file 1103 using a part of data of the third sub-file 1102, and determine an encryption algorithm (RSA) for encrypting the fourth sub-file 1103.

The processor 120 may generate an encryption key (key4) of a fifth sub-file 1104 using a part of data of the fourth sub-file 1103, and determine an encryption algorithm for encrypting the fifth sub-file 1104. The encryption algorithm of the fifth sub-file 1104 may be an encryption algorithm that differs from encryption algorithms used for each of the first sub-file 1100 to the fourth sub-file 1103. Alternatively, the encryption algorithm of the fifth sub-file 1104 may be the same as one of those used among the first sub-file 1100 to the fourth sub-file 1103.

The processor 120 may encrypt the fifth sub-file 1104 using encryption information of the fifth sub-file 1104, and encrypt the fourth sub-file 1103 using encryption information of the fourth sub-file 1103. The processor 120 may encrypt each of the first sub-file 1100, the second sub-file 1101, and the third sub-file 1102 using an encryption method established according to encryption policy information provided by the content providing server. In this case, the processor 120 may simultaneously encrypt the first sub-file 1100 to the fifth sub-file 1104.

Figure 12:
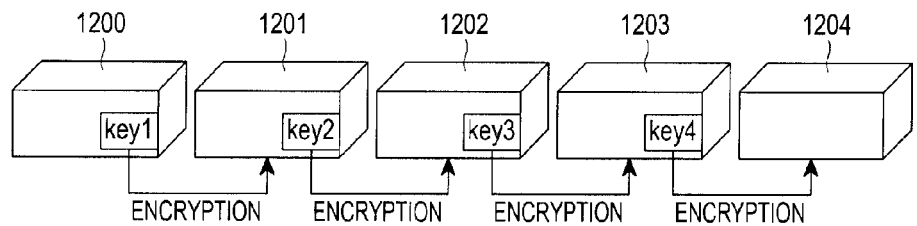
FIG. 12 illustrates an example of a process of excluding a first sub-file of the content file which is divided into the plurality of sub-files by the processor, and encrypting the content file according to various embodiments.

FIG. 12 illustrates an example of a process of encrypting the remaining sub-files except for first sub-file among a plurality of sub-files divided from a content file by the processor according to various embodiments.

According to FIG. 12, the processor 120 may encrypt a second sub-file 1201, a third sub-file 1202, a fourth sub-file 1203, and a fifth sub-file 1204 using the encryption method described in FIG. 11. The processor 120 does not encrypt a first sub-file 1200 and may generate encryption information of the second sub-file 1201 using at least part of data of the first sub-file 1200. When a content file is to be decrypted for content reproduction, the processor 120 may reproduce the first sub-file 1200 which is not encrypted, and decrypt the second sub-file 1201 to the fifth sub-file 1204.

According to various embodiments of the present disclosure, an encryption method by an electronic device may include: an operation of receiving a first data segment of a content file through a network; an operation of encrypting the first data segment on the basis of a policy of a content provider providing the content file; an operation of receiving a second data segment of the content file; and an operation of encrypting the second data segment.

While the exemplary embodiments described herein have been particularly shown and described with reference to specific examples, it will be understood by those of ordinary skill in the art that various changes in form and details may be made therein without departing from the spirit and scope of the claimed subject matter as defined by the following claims.

What is claimed is:

1. An encryption method by an electronic device, the encryption method comprising:
 downloading a first data segment of a content file from an external content provider through a network by the electronic device;
 encrypting the first data segment using a first encryption scheme based on a policy of the external content provider providing the content file by one or more processors at the electronic device;
 downloading a second data segment of the content file;

encrypting the second data segment using a second encryption scheme by the one or more processors at the electronic device;

determining a storage medium in which the encrypted second data segment is to be stored among a plurality of storage mediums based on a value calculated by subtracting a specific value from the first data segment by the one or more processors at the electronic device; and storing the encrypted second data segment in the storage medium, wherein the second encryption scheme utilizes data within the first data segment to generate an encryption key for encrypting the second data segment.

2. The encryption method of claim 1, wherein the second encryption scheme utilizes an encryption algorithm that differs from an encryption algorithm used for the first encryption scheme.

3. The encryption method of claim 1, wherein the encrypting of the first data segment is performed using a first encryption key and the encryption of the second data segment is performed using a second encryption key that differs from the first encryption key.

4. The encryption method of claim 1, wherein encrypting of the second data segment comprises performing encryption on the basis of the policy of the external content provider.

5. The encryption method of claim 1, further comprising: downloading a third data segment of the content file before receiving the first data segment and the second data segment, wherein the third data segment is not encrypted.

6. The encryption method of claim 1, further comprising: storing the encrypted first data segment in the plurality of storage mediums.

7. The encryption method of claim 1, wherein encrypting of the first data segment comprises encrypting the first data segment in an encryption scheme which enables decryption to be faster than an encryption scheme for the second data segment.

8. The encryption method of claim 1, further comprising: configuring sizes of the first data segment and the second data segment according to the policy of the external content provider, a network connection scheme, or a state of the network.

9. The encryption method of claim 1, wherein the encrypting of the second data segment comprises performing encryption using at least part of the first data segment.

10. The encryption method of claim 1, further comprising: downloading the policy from the external content provider.

11. The encryption method of claim 1, wherein downloading the first data segment of the content file comprises downloading the first data segment unencrypted, and wherein downloading the second data segment of the content files comprises downloading the second data segment unencrypted.

12. The encryption method of claim 1, wherein the second encryption scheme also utilizes a unique identification of the electronic device to generate the encryption key.

13. An electronic device, comprising:
a communication interface that receives first and second data segments of a content file through a network from an external content provider; and
one or more processors configured to:
encrypt the first data segment using a first encryption scheme based on a policy of the external content provider providing the content file;
encrypt the second data segment using a second encryption scheme;
determine a storage medium in which the encrypted second data segment is to be stored among a plurality of storage mediums based on a value calculated by subtracting a specific value from the first data segment; and
store the encrypted second data segment in the storage medium,
wherein the second encryption scheme utilizes data within the first data segment to generate an encryption key for encrypting the second data segment.

14. The electronic device of claim 13, wherein the second encryption scheme utilizes an encryption algorithm that differs from an encryption algorithm used for the first encryption scheme.

15. The electronic device of claim 13, wherein the one or more processors are configured to encrypt the first data segment using a first encryption key, and to encrypt the second data segment using a second encryption key that differs from the first encryption key.

16. The electronic device of claim 13, wherein the one or more processors are configured to perform encryption on the basis of the policy of the external content provider.

17. The electronic device of claim 13, wherein the one or more processors are configured to receive a third data segment before receiving the first data segment and the second data segment and not to encrypt the third data segment.

18. The electronic device of claim 13, wherein the one or more processors are configured to store the encrypted first data segment in the plurality of storage mediums.

19. The electronic device of claim 13, wherein the one or more processors are configured to encrypt the first data segment in an encryption scheme which enables decryption to be performed faster than for the second data segment.

20. The electronic device of claim 13, wherein sizes of the first data segment and the second data segment are configured according to the policy of the external content provider, a network connection scheme, or a state of a network.

21. The electronic device of claim 13, wherein the one or more processors are configured to encrypt the second data segment using at least part of the first data segment.

* * * * *